(12) United States Patent
Kashiwagi et al.

(10) Patent No.: US 12,152,149 B2
(45) Date of Patent: Nov. 26, 2024

(54) ASPHALT COMPOSITION

(71) Applicant: KAO CORPORATION, Tokyo (JP)

(72) Inventors: Hirotaka Kashiwagi, Wakayama (JP); Hiroki Kakiuchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 18/289,385

(22) PCT Filed: Jul. 13, 2022

(86) PCT No.: PCT/JP2022/027539
§ 371 (c)(1),
(2) Date: Nov. 3, 2023

(87) PCT Pub. No.: WO2023/286797
PCT Pub. Date: Jan. 19, 2023

(65) Prior Publication Data
US 2024/0279474 A1    Aug. 22, 2024

(30) Foreign Application Priority Data
Jul. 13, 2021    (JP) .................................. 2021-115891

(51) Int. Cl.
*C08L 95/00* (2006.01)
*C08G 69/44* (2006.01)
*E01C 7/26* (2006.01)
*E01C 19/48* (2006.01)

(52) U.S. Cl.
CPC .............. *C08L 95/00* (2013.01); *C08G 69/44* (2013.01); *E01C 7/26* (2013.01); *C08L 2555/22* (2013.01); *C08L 2555/24* (2013.01); *C08L 2555/80* (2013.01); *E01C 19/4873* (2013.01)

(58) Field of Classification Search
CPC ........ E01C 7/26; E01C 19/4873; C08L 95/00; C08L 2555/22; C08L 2555/24; C08L 2555/80; C08G 69/44
USPC ..................................................... 404/17, 72
See application file for complete search history.

(56) References Cited

U.S. PATENT DOCUMENTS

| 7,256,238 B2 * | 8/2007 | Kubo ...................... C08L 53/02 525/218 |
| 2007/0253772 A1 * | 11/2007 | Kubo ...................... C08L 95/00 525/88 |
| 2018/0282576 A1 | 10/2018 | Hashimoto et al. |
| 2019/0135693 A1 | 5/2019 | Shirai |
| 2020/0224033 A1 | 7/2020 | Hashimoto et al. |

FOREIGN PATENT DOCUMENTS

| CN | 102061098 A | 5/2011 |
| CN | 103865262 A | 6/2014 |
| CN | 110536934 A | 12/2019 |
| EP | 0149028 A2 | 7/1985 |
| JP | S60501415 A | 8/1985 |
| JP | 2003013403 A | 1/2003 |
| JP | 2014031649 A | 2/2014 |
| JP | 2016217044 A | 12/2016 |
| JP | 2018003580 A | 1/2018 |
| JP | 2019019325 A | 2/2019 |
| JP | 2020056273 A | 4/2020 |
| KR | 102277654 B1 | 7/2021 |
| WO | WO-2009123228 A1 | 10/2009 |
| WO | WO-2017125421 A1 | 7/2017 |

OTHER PUBLICATIONS

H. Abd El-Wahab, et al., "Preparation and evaluation of a new anti-corrosive coating based on asphalt cement blended with polyesteramide resin for steel protection", Progress in Organic Coatings, 2013, vol. 76 No. 10, p. 1363-1368.
International Search Report issued Sep. 20, 2022 in PCT/JP2022/027539 (with English translation), 7 pages.

* cited by examiner

*Primary Examiner* — Raymond W Addie
(74) *Attorney, Agent, or Firm* — Element IP, PLC

(57) ABSTRACT

An asphalt composition containing asphalt and an asphalt modifier is provided. The asphalt modifier contains a polyesteramide, which contains an alcohol component-derived structural unit, a carboxylic acid component-derived structural unit, and a polyamide component-derived structural unit.

20 Claims, No Drawings

ASPHALT COMPOSITION

FIELD OF THE INVENTION

The present invention relates to an asphalt composition, an asphalt mixture, and methods for producing the same, and an asphalt modifier and a method for producing the same, and also relates to a method for paving a road.

BACKGROUND OF THE INVENTION

Asphalt pavement using an asphalt composition has been frequently performed for paving driveways, parking spaces, cargo yards, sidewalks, etc., because of relatively easy construction and a short period of time from beginning of paving works to traffic start.

In such asphalt pavement, a road surface is formed of an asphalt mixture containing aggregates bonded with each other through asphalt, and hence, the paved roads exhibit good hardness and durability.

However, a rut of wheels or a crack is generated on the asphalt-paved surface through long-term use. Therefore, in such a case, repair of the pavement is inevitably needed, which results in increased maintenance costs and significant influence on car traffic.

WO 2017/125421 (PTL 1) discloses, as an asphalt composition for road pavement excellent in dry strength, water immersion strength, and petroleum immersion strength, an asphalt composition for road pavement that contains an asphalt, a specific amount of a polyester resin, and an aggregate, the polyester resin being a polyester having a structural unit derived from an alcohol component containing a specific amount of an alkylene oxide adduct of bisphenol A and a structural unit derived from a carboxylic acid component containing a specific amount of one or more selected from terephthalic acid and isophthalic acid, the polyester resin having a specific softening point and a specific hydroxyl value.

JP 2016-217044 A (PTL 2) discloses, as a waterproof layer material that is excellent in shear strength at high temperature without impairing shear strength at low temperature and that is also excellent in workability, a waterproof layer material which is used in a waterproof layer formed for a waterproofing measure of a structure, the material containing a polyamide resin having a specific softening point and a specific melt viscosity at 180° C.

SUMMARY OF THE INVENTION

The present invention relates to the following [1] to [6].
[1] An asphalt composition containing an asphalt and an asphalt modifier, the asphalt modifier containing a polyesteramide that contains an alcohol component-derived structural unit, a carboxylic acid component-derived structural unit, and a polyamide component-derived structural unit.
[2] An asphalt mixture containing the asphalt composition according to the above [1] and an aggregate.
[3] An asphalt modifier containing a polyesteramide that contains an alcohol component-derived structural unit, a carboxylic acid component-derived structural unit, and a polyamide component-derived structural unit.
[4] A method for producing the asphalt modifier according to the above [3], the method including the following Step 1:

Step 1: a step of polycondensating an alcohol component, a carboxylic acid component, and a polyamide component to provide a polyesteramide.
[5] A method for producing the asphalt mixture according to the above [2], the method including the following Step 1 and Step 2:
Step 1: a step of polycondensating an alcohol component, a carboxylic acid component, and a polyamide component to provide a polyesteramide;
Step 2: a step of mixing a heated aggregate, an asphalt, and the polyesteramide obtained in Step 1.
[6] A method for paving a road, the method including a step of laying the asphalt mixture according to the above [2] onto a road to form an asphalt pavement material layer.

DETAILED DESCRIPTION OF THE INVENTION

When asphalt pavement exposed to rainwater or the like is insufficient in water resistance, water penetrates between asphalt and aggregate and remains there, and thus, a problem arises in that the water strips asphalt film from the surface of the aggregate, which causes formation of gravel in the asphalt pavement in cooperation with the load by vehicular traffic.

In the technique disclosed in PTL 1, although a superior water resistance is exhibited under a condition of 50° C. or lower, a further water resistance is desired under a high-temperature condition of 60° C. or higher.

PTL 2 does not relate to the problem in asphalt pavement.

The present invention relates to an asphalt composition and an asphalt modifier that can provide asphalt pavement superior in water resistance even under a high-temperature condition, and methods for producing the asphalt composition and the asphalt modifier, an asphalt mixture and a method for producing the asphalt mixture, and a method for paving a road.

According to the present invention, it is possible to provide an asphalt composition and an asphalt modifier that can provide asphalt pavement superior in water resistance even under a high-temperature condition and methods for producing the asphalt composition and the asphalt modifier, an asphalt mixture and a method for producing the asphalt mixture, and a method for paving a road.

The asphalt composition of the present invention contains an asphalt and a polyesteramide as an asphalt modifier. As the asphalt modifier, one kind can be used alone or two or more kinds can be used in combination.

Hereinafter, an asphalt modifier contained in the asphalt composition and a method for producing the asphalt modifier, the asphalt composition and a method for producing the asphalt composition, an asphalt mixture and a method for producing the asphalt mixture, and a method for paving a road will be described in this order.

[Asphalt Modifier]

The asphalt modifier of the present invention contains a polyesteramide that contains an alcohol component-derived structural unit, a carboxylic acid component-derived structural unit, and a polyamide component-derived structural unit.

By incorporating, into an asphalt composition and an asphalt mixture, an asphalt modifier containing the polyesteramide that contains an alcohol component-derived structural unit, a carboxylic acid component-derived structural unit, and a polyamide component-derived structural unit, an asphalt composition and an asphalt mixture that are superior in water resistance even under a high-temperature condition can be obtained.

The reason why the effect of the present invention can be achieved is not clear, but is considered as follows.

In asphalt pavement, generally, asphalt coats aggregates to bond the aggregates. In the technique disclosed in PTL 1, the ester groups of the polyester in the asphalt interact with polar groups, such as silanol groups, on the aggregate surface by hydrogen bond to increase the adhesion among the aggregates, providing water resistance. However, under a high-temperature condition of 60° C. or higher, the polyester molecular chains and water molecules move more intensely, and the intervention of the water molecules in the aggregate surface inhibits the interaction between the aggregate surface and the polyester. Thus, it becomes difficult to exhibit the water resistance.

In the present invention, presumably, in the polyesteramide obtained by incorporating an amide group into a polyester, the amide groups interact with aggregate by hydrogen bond more strongly and at a larger number of points, and thus, the inhibition of interaction by the intervention of water molecules is less likely to occur even under a high-temperature condition and the water resistance is exhibited even under a high-temperature condition.

The definitions and the like of the terms in this description will be described below.

In the polyesteramide, "an alcohol component-derived structural unit" means a structure obtained by removing a hydrogen atom from a hydroxy group of an alcohol component, and "a carboxylic acid component-derived structural unit" means a structure obtained by removing a hydroxy group from a carboxy group of a carboxylic acid component.

"A carboxylic acid component" is a concept encompassing not only the carboxylic acid but also the anhydride which decomposes in a reaction to produce the acid and alkyl esters of the carboxylic acid (for example, the number of carbon atoms of the alkyl group is 1 or more and 3 or less). When the carboxylic acid component is an alkyl ester of the carboxylic acid, the number of the carbon atoms of the carboxylic acid component does not include the number of carbon atoms of the alkyl group which is the alcohol residue of the easter.

[Polyesteramide]

The polyesteramide that constitutes the asphalt modifier of the present invention contains an alcohol component-derived structural unit, a carboxylic acid component-derived structural unit, and a polyamide component-derived structural unit. A polyesteramide is a polycondensate obtained by subjecting an alcohol component, a carboxylic acid component, and a polyamide component to a polycondensation reaction. In other words, the asphalt modifier of the present invention can be obtained by a production method including the following Step 1.

Step 1: a step of polycondensating an alcohol component, a carboxylic acid component, and a polyamide component to provide a polyesteramide Hereinafter, the properties and the like of the alcohol component, the carboxylic acid component, the polyamide component, and the polyesteramide will be described.

<Alcohol Component>

Examples of the alcohol component include an aliphatic diol, an aromatic diol, and a trihydric or higher polyhydric alcohol. One of the alcohol components can be used alone or two or more thereof can be used in combination.

The aliphatic diol is preferably a linear or branched aliphatic diol having 2 or more and 12 or less carbon atoms, more preferably a linear or branched aliphatic diol having 2 or more and 8 or less carbon atoms. Specific examples of the aliphatic diol include ethylene glycol, 1,2-propanediol, 1,3-propanediol, 1,3-butanediol, 1,4-butanediol, 1,4-butenediol, 1,5-pentanediol, 1,6-hexanediol, neopentyl glycol, 1,10-decanediol, and 1,12-dodecanediol.

An example of the aromatic diol is an alkylene oxide adduct of bisphenol A. An example of the alkylene oxide adduct of bisphenol A is an alkylene oxide adduct of bisphenol A represented by the following formula (I).

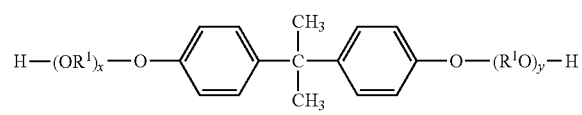

(I)

[In the formula, $OR^1$ and $R^1O$ are an alkylene oxide, $R^1$ is an alkylene group having 2 or 3 carbon atoms, x and y represent a positive number indicating the average number of moles of the alkylene oxide added, the sum of x and y is preferably 1 or more, more preferably 1.5 or more, and preferably 16 or less, more preferably 8 or less, further preferably 4 or less.]

Examples of the trihydric or higher polyhydric alcohol include glycerol, pentaerythritol, trimethylolpropane, and sorbitol.

From the viewpoint of controlling the properties, the alcohol component can further contain a monohydric aliphatic alcohol. Examples of the monohydric aliphatic alcohol include lauryl alcohol, myristyl alcohol, palmityl alcohol, and stearyl alcohol. One of the monohydric aliphatic alcohols can be used alone or two or more thereof can be used in combination.

From the viewpoint of the water resistance at high temperature, the alcohol component preferably contains an alkylene oxide adduct of bisphenol A, more preferably contains an alkylene oxide adduct of bisphenol A represented by the formula (I).

Examples of the alkylene oxide adduct of bisphenol A represented by the formula (I) include a propylene oxide adduct of 2,2-bis(4-hydroxyphenyl)propane and an ethylene oxide adduct of 2,2-bis(4-hydroxyphenyl)propane. One of the alkylene oxide adducts of bisphenol A can be used alone or two or more thereof can be used in combination. Among them, a combination of a propylene oxide adduct of 2,2-bis (4-hydroxyphenyl)propane and an ethylene oxide adduct of 2,2-bis(4-hydroxyphenyl)propane is preferred.

From the viewpoint of the water resistance at high temperature, the amount of the alkylene oxide adduct of bisphenol A in the alcohol component is 65% by mole or more, more preferably 75% by mole or more, more preferably 90% by mole or more, further preferably 100% by mole.

The molar ratio of the propylene oxide adduct of bisphenol A/the ethylene oxide adduct of bisphenol A is, from the viewpoints of the dry strength of the asphalt pavement and the water resistance, preferably 10/90 or more, more preferably 20/80 or more, further preferably 30/70 or more, and from the viewpoints of the dry strength of the asphalt pavement, the water resistance, and the oil resistance, preferably 70/30 or less, more preferably 60/40 or less, more preferably 50/50 or less.

<Carboxylic Acid Component>

Examples of the carboxylic acid component include an aliphatic dicarboxylic acid, an aromatic dicarboxylic acid, and a tribasic or higher and hexabasic or lower polybasic carboxylic acid. One of the carboxylic acid components can be used alone or two or more thereof can be used in combination.

Examples of the aliphatic dicarboxylic acid include aliphatic dicarboxylic acids with a mainchain having preferably 4 or more, and preferably 10 or less, more preferably 8 or less, more preferably 6 or less carbon atoms, such as fumaric acid, maleic acid, oxalic acid, malonic acid, citraconic acid, itaconic acid, glutaconic acid, succinic acid, adipic acid, suberic acid, azelaic acid, sebacic acid, dodecanedioic acid, succinic acid substituted with an alkyl group having 1 or more and 20 or less carbon atoms or an alkenyl group having 2 or more and 20 or less carbon atoms, anhydrides thereof, and alkyl esters thereof (for example, the number of carbon atoms of the alkyl group is 1 or more and 3 or less). Examples of the substituted succinic acid include dodecylsuccinic acid, dodecenylsuccinic acid, and octenylsuccinic acid.

Examples of the aromatic dicarboxylic acid include phthalic acid, terephthalic acid, isophthalic acid, naphthalenedicarboxylic acid, anhydrides thereof, and alkyl esters thereof (for example, the number of carbon atoms of the alkyl group is 1 or more and 3 or less). Among the above aromatic dicarboxylic acids, from the viewpoint of reducing the amount of microplastics generated, isophthalic acid and terephthalic acid are preferred, and terephthalic acid is more preferred.

The tribasic or higher and hexabasic or lower polybasic carboxylic acid is preferably a tribasic carboxylic acid. Examples of the tribasic or higher and hexabasic or lower polybasic carboxylic acids include trimellitic acid, 2,5,7-naphthalenetricarboxylic acid, pyromellitic acid, or acid anhydrides thereof.

From the viewpoint of controlling the properties, the carboxylic acid component can further contain a monobasic aliphatic carboxylic acid. Examples of the monobasic aliphatic carboxylic acid include monobasic aliphatic carboxylic acids having 12 or more and 20 or less carbon atoms, such as lauric acid, myristic acid, palmitic acid, stearic acid, and alkyl (the number of carbon atoms is 1 or more and 3 or less) esters thereof. One of the monobasic aliphatic carboxylic acids can be used alone or two or more thereof can be used in combination.

From the viewpoint of the water resistance at high temperature, the carboxylic acid component preferably contains one or more selected from terephthalic acid and isophthalic acid, more preferably contains terephthalic acid.

From the viewpoints of the melt dispersibility in the asphalt and the dry strength of the asphalt pavement, the content of one or more selected from terephthalic acid and isophthalic acid in the carboxylic acid component is 50% by mole or more, preferably 60% by mole or more, preferably 80% by mole or more, more preferably 100% by mole.

<Polyamide Component>

Examples of the polyamide include an aliphatic polyamide and an aromatic polyamide.

Examples of the polyamide include a polyamide constituted of a polycondensate of a diamine and a dicarboxylic acid, a polyamide constituted of a polycondensate of a lactam, a polyamide constituted of a polycondensate of an aminocarboxylic acid, and a polyamide constituted of a copolymer of a lactam and an aminocarboxylic acid.

Examples of the diamine include an aliphatic diamine and a diamine having an aromatic or cyclic structure.

Examples of the aliphatic diamine include tetramethylenediamine, hexamethylenediamine, octamethylenediamine, nonamethylenediamine, undecamethylenediamine, and dodecamethylenediamine.

An example of the diamine having an aromatic or cyclic structure is m-xylylenediamine.

Examples of the dicarboxylic acid include an aliphatic dicarboxylic acid and a dicarboxylic acid having an aromatic or cyclic structure.

Examples of the aliphatic dicarboxylic acid include adipic acid, heptanedicarboxylic acid, octanedicarboxylic acid, nonanedicarboxylic acid, undecanedicarboxylic acid, and dodecanedicarboxylic acid.

Examples of the dicarboxylic acid having an aromatic or cyclic structure include terephthalic acid and isophthalic acid.

An example of the lactam is a lactam having 6 or more and 12 or less carbon atoms. An example of the aminocarboxylic acid is an aminocarboxylic acid having 6 or more and 12 or less carbon atoms. Examples thereof include 6-aminocaproic acid, 7-aminoheptanoic acid, 11-aminoundecanoic acid, 12-aminododecanoic acid, α-pyrrolidone, ε-caprolactam, ω-laurolactam, ε-enantholactam, and lauryllactam.

Examples of the aliphatic polyamide include aliphatic nylons and copolymers thereof, such as polycaproamide (nylon 6), poly-@-aminoheptanoic acid (nylon 7), poly-ω-aminononanoic acid (nylon 9), polyundecanamide (nylon 11), polylauryllactam (nylon 12), polyethylenediamine adipamide (nylon 2,6), polytetramethylene adipamide (nylon 4,6), polyhexamethylene adipamide (nylon 6,6), polyhexamethylene sebacamide (nylon 6,10), polyhexamethylene dodecamide (nylon 6,12), polyoctamethylene adipamide (nylon 8,6), polydecamethylene adipamide (nylon 10,8), a caprolactam/lauryllactam copolymer (nylon 6/12), a caprolactam/@-aminononanoic acid copolymer (nylon 6/9), a caprolactam/hexamethylenediammonium adipate copolymer (nylon 6/6,6), a lauryllactam/hexamethylenediammonium adipate copolymer (nylon 12/6,6), an ethylenediamine adipamide/hexamethylenediammonium adipate copolymer (nylon 2,6/6,6), a caprolactam/hexamethylenediammonium adipate/hexamethylenediammonium sebacate copolymer (nylon 6,6/6,10), and an ethyleneammonium adipate/hexamethylenediammonium adipate/hexamethylenediammonium sebacate copolymer (nylon 6/6,6/6,10). Among them, nylon 6, nylon 6,6, and nylon 6/6,6 (a copolymer of nylon 6 and nylon 6,6) are preferred.

Examples of the aromatic polyamide include crystalline aromatic polyamides obtained by a polycondensation reaction of an aromatic diamine, such as m-xylylenediamine or p-xylylenediamine, with a dicarboxylic acid, such as adipic acid, suberic acid, sebacic acid, cyclohexanedicarboxylic acid, terephthalic acid, or isophthalic acid, or a derivative thereof. Among them, a crystalline aromatic polyamide, such as poly-m-xylyleneadipamide (MXD-nylon), is preferred.

From the viewpoint of the water resistance at high temperature, the polyamide component preferably contains an aliphatic polyamide, more preferably one or more selected from nylon 6, nylon 2,6, nylon 4,6, nylon 6,6, and nylon 12, further preferably one or more selected from nylon 6, nylon 6,6, and nylon 12, further preferably one or more selected from nylon 6 and nylon 6,6.

From the viewpoint of the water resistance at high temperature, the content of one or more selected from nylon 6 and nylon 6,6 in the polyamide component is 50% by mole or more, preferably 60% by mole or more, preferably 80% by mole or more, more preferably 100% by mole.

<Molar Ratio of Carboxylic Acid Component-Derived Structural Unit to Alcohol Component-Derived Structural Unit>

From the viewpoint of adjusting the hydroxyl value, the molar ratio of the carboxylic acid component-derived structural unit to the alcohol component-derived structural unit [carboxylic acid component/alcohol component] in the polyesteramide is preferably 0.7 or more, more preferably 0.8 or more, and preferably 1.5 or less, more preferably 1.3 or less, more preferably 1.1 or less, more preferably less than 1.0.

<Molar Ratio of Alcohol Component-Derived Structural Unit to Amide Bond in Polyamide Component>

From the viewpoint of the water resistance in a high-temperature condition, the molar ratio of the alcohol component-derived structural unit to the amide bond in the polyamide component [alcohol component/amide bond] (A/N ratio) in the polyesteramide is preferably 40/60 or more, more preferably 60/40 or more, and preferably 95/5 or less, more preferably 93/7 or less, further preferably 90/10 or less. The A/N ratio may be 70/30 or more, or may be 80/20 or more.

<Properties of Polyesteramide>

From the viewpoint of the dry strength of the asphalt pavement, the acid value of the polyesteramide is preferably 2 mgKOH/g or more, more preferably 3 mgKOH/g or more, further preferably 4 mgKOH/g or more, and preferably 40 mgKOH/g or less, more preferably 30 mgKOH/g or less, further preferably 20 mgKOH/g or less.

The hydroxyl value of the polyesteramide is, from the viewpoint of the dry strength of the asphalt pavement, preferably 1 mgKOH/g or more, more preferably 2 mgKOH/g or more, further preferably 5 mgKOH/g or more, and, from the viewpoint of enhancing the dry strength and the water immersion strength, preferably 50 mgKOH/g or less, preferably 30 mgKOH/g or less.

The softening point of the polyesteramide is, from the viewpoint of exhibiting a high bonding strength to aggregate to enhance the dry strength, preferably 85° C. or higher, more preferably 90° C. or higher, further preferably 95° C. or higher, and, from the viewpoint of providing a superior melt dispersibility in asphalt to increase the dry strength, preferably 140° C. or lower, more preferably 130° C. or lower, further preferably 120° C. or lower. The glass transition point of the polyesteramide is, from the viewpoint of enhancing the dry strength, preferably 30° C. or higher, more preferably 40° C. or higher, further preferably 45° C. or higher, and, from the viewpoint of providing a superior melt dispersibility in asphalt to enhance the dry strength, preferably 80° C. or lower, more preferably 70° C. or lower, further preferably 65° C. or lower.

From the viewpoint of providing a superior melt dispersibility in asphalt to enhance the dry strength, the polyesteramide has a solubility in toluene at 20° C. of preferably 10 g/L or more, more preferably 15 g/L or more, further preferably 20 g/L or more.

The solubility in toluene at 20° C. can be measured by dissolving a prescribed amount of a polyesteramide in a prescribed amount of toluene, allowing the solution to stand for a prescribed period of time, and then, checking the presence of a precipitate, as shown in the section of Examples.

The acid value, the hydroxyl value, the softening point, and the glass transition point can be adjusted by the raw material monomer composition, the molecular weight, the amount of catalyst, or reaction conditions. The acid value, the hydroxyl value, the softening point, and the glass transition point can be measured by methods described later in the section of Example.

<Method for Producing Polyesteramide>

The method for producing the polyesteramide is not particularly limited, but, for example, the polyesteramide can be produced by polycondensating the alcohol component, the carboxylic acid component, and the polyamide component described above.

The timing of addition of the polyamide component is not particularly limited, but the polyamide component is preferably added, together with the alcohol component and the carboxylic acid component, before starting the reaction.

The temperature in the polycondensation reaction is, from the viewpoint of reactivity, preferably 160° C. or higher, more preferably 190° C. or higher, further preferably 220° C. or higher, and preferably 260° C. or lower, more preferably 250° C. or lower, further preferably 240° C. or lower.

In the polycondensation reaction, from the viewpoint of the reaction rate, a tin (II) compound having no Sn—C bond, such as tin(II) di(2-ethylhexanoate), can be used as an esterification catalyst. From the viewpoint of the reaction rate, the amount of the esterification catalyst used is, relative to 100 parts by mass of the total amount of the alcohol component, the carboxylic acid component, and the polyamide component, preferably 0.01 parts by mass or more, more preferably 0.1 parts by mass or more, further preferably 0.2 parts by mass or more, and preferably 1.5 parts by mass or less, more preferably 1.0 parts by mass or less, further preferably 0.6 parts by mass or less.

In the polycondensation reaction, from the viewpoint of the reaction rate, in addition to the esterification catalyst, a pyrogallol compound, such as gallic acid, can be used as a promoter. From the viewpoint of the reaction rate, the amount of the promoter used is, relative to 100 parts by mass of the total amount of the alcohol component, the carboxylic acid component, and the polyamide component, preferably 0.001 parts by mass or more, more preferably 0.005 parts by mass or more, further preferably 0.01 parts by mass or more, and preferably 0.15 parts by mass or less, more preferably 0.10 parts by mass or less, further preferably 0.05 parts by mass or less.

In the polycondensation reaction, from the viewpoint of the reaction rate, in addition to the catalyst, a polymerization inhibitor, such as t-butyl catechol, can be used. From the viewpoint of the reaction rate, the amount of the polymerization inhibitor used is, relative to 100 parts by mass of the total amount of the alcohol component, the carboxylic acid component, and the polyamide component, preferably 0.001 parts by mass or more, more preferably 0.01 parts by mass or more, and preferably 0.5 parts by mass or less, more preferably 0.2 parts by mass or less.

In the method for producing a polyesteramide, in a spectrum obtained by infrared spectroscopy (IR) of the polyamide component before the polycondensation reaction, a peak derived from the amide C=O stretching vibration of the polyamide is preferably observed in 1630 cm-1 to 1640 cm-1. However, after the polycondensation reaction, since the peak derived from the amide C=O stretching vibration shifts, the peak is not observed in the region of 1630 cm-1 to 1640 cm-1.

Accordingly, in a spectrum obtained by infrared spectroscopy (IR) of the polyesteramide constituting the asphalt modifier of the present invention, a peak derived from the amide C=O stretching vibration in 1630 cm-1 to 1640 cm-1 is preferably not observed.

The spectrum obtained by infrared spectroscopy (IR) is measured by using Nicolet Summit FT-IR spectrophotometer manufactured by Thermo Fisher Scientific.

The asphalt modifier of the present invention may contain a component other than the polyesteramide to the extent that the effect is not impaired, or may be constituted only of the polyesteramide.

The content of the polyesteramide in the asphalt modifier in the total mass of the asphalt modifier is preferably 50% by mass or more, more preferably 70% by mass or more, further preferably 90% by mass or more.

The asphalt modifier of the present invention can be used, for example, for obtaining an asphalt composition by being mixed with an asphalt. A heated aggregate is added to the resulting asphalt composition to form an asphalt mixture, which can then be used for pavement. The asphalt modifier of the present invention can be suitably used as a modifier that is to be blended into an asphalt mixture that contains an aggregate.

[Asphalt Composition]

The asphalt composition of the present invention contains an asphalt and the asphalt modifier (polyesteramide). As the asphalt modifier, one kind can be used alone or two or more kinds can be used in combination.

The content of the asphalt modifier (polyesteramide) is, from the viewpoint of accelerating development of the water resistance, relative to 100 parts by mass of the asphalt, preferably 0.1 parts by mass or more, more preferably 1 part by mass or more, further preferably 2 parts by mass or more, and from the viewpoint of workability, preferably 50 parts by mass or less, more preferably 30 parts by mass or less, further preferably 15 parts by mass or less.

<Asphalt>

As the asphalt, various asphalts can be used. Examples thereof include straight asphalt which is a petroleum asphalt for pavement and a modified asphalt. Examples of the modified asphalt include a blown asphalt; and a polymer-modified asphalt modified with a polymer material, such as a thermoplastic elastomer or a thermoplastic resin. The straight asphalt refers to a residual bituminous material obtained by treating a crude oil in an atmospheric distillation apparatus, a vacuum distillation apparatus, or the like. The blown asphalt means an asphalt obtained by heating a mixture of a straight asphalt and a heavy oil and then, blowing air thereinto to cause oxidation. The asphalt is preferably selected from a straight asphalt and a polymer-modified asphalt. From the viewpoint of durability of the asphalt pavement, a modified asphalt is more preferred, and from the viewpoint of versatility, a straight asphalt is more preferred.

(Thermoplastic Elastomer)

Examples of the thermoplastic elastomer in the polymer-modified asphalt include at least one selected from a styrene/butadiene block copolymer (hereinafter also referred to as "SB"), a styrene/butadiene/styrene block copolymer (hereinafter also referred to as "SBS"), a styrene/butadiene random copolymer (hereinafter also referred to as "SBR"), a styrene/isoprene block copolymer (hereinafter also referred to as "SI"), a styrene/isoprene/styrene block copolymer (hereinafter also referred to as "SIS"), a styrene/isoprene random copolymer (hereinafter also referred to as "SIR"), an ethylene/vinyl acetate copolymer, an ethylene/acrylate ester copolymer, a styrene/ethylene/butylene/styrene copolymer, a styrene/ethylene/propylene/styrene copolymer, a polyurethane-based thermoplastic elastomer, a polyolefin-based thermoplastic elastomer, an isobutylene/isoprene copolymer, a polyisoprene, a polychloroprene, a synthetic rubber other than the above, and a natural rubber.

Among them, the thermoplastic elastomer is, from the viewpoint of durability of the asphalt pavement, preferably at least one selected from SB, SBS, SBR, SI, SIS, SIR, and an ethylene/acrylate ester copolymer, more preferably at least one selected from SB, SBS, SBR, SI, SIS, and SIR, further preferably at least one selected from SBR and SBS.

The content of the thermoplastic elastomer in the polymer-modified asphalt is, from the viewpoint of durability of the asphalt pavement, preferably 0.1% by mass or more, more preferably 0.5% by mass or more, further preferably 1% by mass or more, and preferably 30% by mass or less, more preferably 15% by mass or less, further preferably 5% by mass or less.

The content of the asphalt in the asphalt composition is, from the viewpoint of exhibiting asphalt performance, preferably 60% by mass or more, more preferably 65% by mass or more, further preferably 70% by mass or more, and from the viewpoint of storage stability, preferably 99% by mass or less, more preferably 98% by mass or less, further preferably 97% by mass or less.

[Method for Producing Asphalt Composition]

The method for producing the asphalt composition of the present invention includes a step of mixing an asphalt and the asphalt modifier (polyesteramide). In other words, the asphalt composition of the present invention is an asphalt composition obtained by blending an asphalt and the asphalt modifier.

The asphalt composition is obtained by melting an asphalt with heat, adding the asphalt modifier thereto, and mixing the mixture by stirring with a generally used mixer until the components are uniformly dispersed. Examples of the generally used mixier include a homomixer, a dissolver, a paddle mixer, a ribbon mixer, a screw mixer, a planetary mixer, a vacuum reverse-flow mixer, a roll mill, and a twin-screw extruder.

The temperature in mixing the asphalt and the asphalt modifier is, from the viewpoint of uniformly dispersing the polyesteramide which constitutes the asphalt modifier in the asphalt, preferably 130° C. or higher, more preferably 150° C. or higher, further preferably 170° C. or higher, and preferably 230° C. or lower, further preferably 210° C. or lower, more preferably 200° C. or lower.

The time of mixing the asphalt and the asphalt modifier is, from the viewpoint of efficiently uniformly dispersing the polyesteramide which constitutes the asphalt modifier in the asphalt, preferably 30 seconds or more, more preferably 1 minute or more, further preferably 2 minutes or more, and preferably 2 hours or less, more preferably 1 hour or less, further preferably 30 minutes or less.

The asphalt composition of the present invention is a binder composition, and, for example, is used for pavement after an aggregate is added to the asphalt composition to prepare an asphalt mixture. In other word, the asphalt composition of the present invention is suitable for pavement, in particular, for pavement of a road.

[Asphalt Mixture]

The asphalt mixture of the present invention contains an aggregate and the asphalt composition. In other words, the asphalt mixture contains at least an aggregate, an asphalt, and the asphalt modifier (polyesteramide).

The content of the asphalt modifier (polyesteramide) in the asphalt mixture is preferably 0.01% by mass or more, more preferably 0.05% by mass or more, further preferably 0.10% by mass or more, further preferably 0.15% by mass or more, and preferably 4% by mass or less, more preferably 3% by mass or less, further preferably 2% by mass or less, further preferably 1% by mass or less.

The content of the asphalt in the asphalt mixture is preferably 2.5% by mass or more, more preferably 3% by mass or more, further preferably 3.5% by mass or more, further preferably 4% by mass or more, and preferably 10% by mass or less, more preferably 9% by mass or less, further preferably 8% by mass or less, further preferably 7% by mass or less.

<Aggregate>

As the aggregate, for example, any of crushed stones, cobble stones, gravel, sand, recycled aggregate, ceramic, and the like can be selected and used. As the aggregate, any of a coarse aggregate having a particle diameter of 2.36 mm or more and a fine aggregate having a particle diameter of less than 2.36 mm can be used.

Examples of the coarse aggregate include crushed stones having a particle diameter range of 2.36 mm or more and less than 4.75 mm, crushed stones having a particle diameter range of 4.75 mm or more and less than 12.5 mm, crushed stones having a particle diameter range of 12.5 mm or more and less than 19 mm, and crushed stones having a particle diameter range of 19 mm or more and less than 31.5 mm.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and recycled aggregate-crushed sand.

The aforementioned particle diameters are values prescribed in JIS 5001: 2008.

Among them, a combination of the coarse aggregate and the fine aggregate is preferred.

The fine aggregate may contain a filler having a particle diameter of less than 0.075 mm. Examples of the filler include sand, fly ash, calcium carbonate, such as limestone powder, and hydrated lime. Among them, from the viewpoint of enhancing the strength of the asphalt pavement, calcium carbonate is preferred.

From the viewpoint of enhancing the strength of the asphalt pavement, the average particle diameter of the filler is preferably 0.001 mm or more, and preferably 0.05 mm or less, more preferably 0.03 mm or less, further preferably 0.02 mm or less.

Here, the average particle diameter means an average particle diameter of 50% cumulative volume (D50), and can be measured by a laser diffraction particle size distribution analyzer.

From the viewpoint of the water resistance in a high-temperature condition, the aggregate has a content of a powder component with a particle diameter of 150 μm or less of preferably 8% by mass or more, more preferably 8.5% by mass or more, further preferably 9% by mass or more, and preferably 15% by mass or less, more preferably 12% by mass or less, further preferably 10% by mass or less.

The powder component with a particle diameter of 150 μm or less contains a filler having a particle diameter of less than 0.075 mm and a microfine aggregate which is a fine aggregate that has a particle diameter of 0.075 mm or more and 0.150 mm or less.

The mass ratio of the coarse aggregate and the fine aggregate is, from the viewpoint of durability of the asphalt pavement, preferably 10/90 or more, more preferably 15/85 or more, further preferably 20/80 or more, and preferably 90/10 or less, more preferably 80/20 or less, further preferably 70/30 or less.

The content of the aggregate in the asphalt mixture is preferably 90% by mass or more, preferably 92% by mass or more, preferably 93% by mass or more, and preferably 98% by mass or less, preferably 97% by mass or less, preferably 96% by mass or less.

Suitable examples of blending in the asphalt mixture include the following (1) to (3).
(1) A fine-graded asphalt which contains 30% by volume or more and less than 45% by volume of the coarse aggregate, 30% by volume or more and 50% by volume or less of the fine aggregate, and 5% by volume or more and 10% by volume or less of the asphalt composition.
(2) An example of the asphalt mixture is a dense-graded asphalt which contains, for example, 45% by volume or more and less than 70% by volume of the coarse aggregate, 20% by volume or more and 45% by volume or less of the fine aggregate, and 3% by volume or more and 10% by volume or less of the asphalt composition.
(3) A porous asphalt which contains 70% by volume or more and 80% by volume or less of the coarse aggregate, 10% by volume or more and 20% by volume or less of the fine aggregate, and 3% by volume or more and 10% by volume or less of the asphalt composition.

In a conventional asphalt mixture containing an aggregate and an asphalt, a blending proportion of the asphalt is generally adopted according to an optimum asphalt amount obtained from "Formulation and Design of Asphalt Composition" as described in "Guideline for Pavement Design and Construction" published by Japan Road Association.

In the present invention, the aforementioned optimum asphalt amount corresponds to the total amount of the asphalt and the asphalt modifier. However, the method of determining the amount is not to be limited to the method as described in "Guideline for Pavement Design and Construction", and the amount may also be determined by any other methods.

[Method for Producing Asphalt Mixture]

The method for producing the asphalt mixture of the present invention includes a step of mixing a heated aggregate, an asphalt, and a polyesteramide obtained by polycondensation of an alcohol component, a carboxylic acid component, and a polyamide component. In other words, the asphalt mixture of the present invention is an asphalt mixture obtained by blending an asphalt, an aggregate, and the asphalt modifier.

In the step of mixing, the heated aggregate, the asphalt, and the polyamide can be mixed at once or in any order.

A preferred aspect of the method for producing the asphalt mixture includes the following Step 1 and Step 2.
Step 1: a step of polycondensating an alcohol component, a carboxylic acid component, and a polyamide component to provide a polyesteramide
Step 2: a step of mixing a heated aggregate, an asphalt, and the polyesteramide obtained in Step 1

The step of providing a polyesteramide of Step 1 can be performed by the method for producing a polyesteramide described above Specific examples of the method for producing the asphalt mixture include conventional methods for producing an asphalt mixture called a plant mix method, a premix method, and the like. The methods are all a method in which an asphalt and an asphalt modifier are added to a heated aggregate.

The step of mixing is preferably performed by any of the following (i) to (iii).
(i) A method in which a heated aggregate and an asphalt are mixed to provide a mixture, and then, the mixture and an asphalt modifier are mixed.
(ii) A method in which an asphalt and an asphalt modifier are added at once to and mixed with a heated aggregate.

(iii) A method in which a mixture of an asphalt and an asphalt modifier which are mixed in advance is added to and mixed with a heated aggregate.

Among the methods, the method (i) is preferred from the viewpoint of durability of the asphalt pavement.

In the methods (i) to (iii), the temperature of the heated aggregate is, from the viewpoint of durability of the asphalt pavement, preferably 130° C. or higher, more preferably 150° C. or higher, further preferably 170° C. or higher, and from the viewpoint of preventing thermal degradation of the asphalt, preferably 230° C. or lower, more preferably 210° C. or lower, further preferably 200° C. or lower.

The temperature in mixing is, from the viewpoint of durability of the asphalt pavement, preferably 130° C. or higher, more preferably 150° C. or higher, further preferably 170° C. or higher, and from the viewpoint of preventing thermal degradation of the asphalt, preferably 230° C. or lower, more preferably 210° C. or lower, further preferably 200° C. or lower.

The time of mixing is not particularly limited, but preferably 30 seconds or more, more preferably 1 minute or more, further preferably 2 minutes or more, and preferably 2 hours or less, more preferably 1 hour or less, further preferably 30 minutes or less.

From the viewpoint of durability of the asphalt pavement, the method for producing the asphalt mixture preferably includes, after mixing the asphalt, the aggregate, and the asphalt modifier, a step of keeping the resulting asphalt mixture at the mixing temperature mentioned above or a temperature of the mixing temperature or higher.

In the step of keeping the asphalt mixture, the mixture can be further mixed.

The time of keeping is preferably 0.25 hours or more, more preferably 0.5 hours or more, further preferably 1 hour or more, and the upper limit of the time is not particularly limited, but, for example, is about 5 hours. The time of keeping for exhibiting the effect of the present invention may be 3 hours or less, preferably 1 hour or less, more preferably 0.5 hours or less.

[Road Pavement Method]

The asphalt mixture of the present invention is suitable for paving a road, and as described above, an asphalt mixture in which an aggregate is added to the asphalt composition is used for paving a road.

The method for paving a road preferably includes a step of laying the asphalt mixture on a road to form an asphalt pavement material layer. Specifically, the method for paving a road includes a step of mixing an asphalt, the asphalt modifier, and an aggregate to obtain an asphalt mixture (Step 2), and a step of laying the asphalt mixture obtained in the Step 2 on a road to form an asphalt pavement material layer (Step 3). The asphalt pavement material layer is preferably a base course or a surface course.

The asphalt mixture may be subjected to compaction laying by such a method using a known laying machine. In the case of using a heated asphalt mixture, from the viewpoint of durability of the asphalt pavement, the compaction temperature thereof is preferably 100° C. or higher, more preferably 120° C. or higher, further preferably 130° C. or higher, and preferably 200° C. or lower, more preferably 180° C. or lower.

EXAMPLES

Property values of resins and the like were measured and evaluated by the following methods.

[Measurement Methods]

[Acid Value and Hydroxyl Value of Polyesteramide]

An acid value and a hydroxyl value of a polyesteramide were each measured on the basis of the method of JIS K0070:1992. However, only the measuring solvent was changed from the mixed solvent of ethanol and ether as prescribed in JIS K0070:1992 to a mixed solvent of acetone and toluene (acetone/toluene=1/1 (volume ratio)).

[Softening Point and Glass Transition Point]

(1) Softening Point

Using a flow tester "CFT-500D" (manufactured by Shimadzu Corporation), while heating 1 g of a sample at a temperature rise rate of 6° C./min, the sample was extruded through a nozzle having a diameter of 1 mm and a length of 1 mm with a load of 1.96 MPa applied by a plunger. The amount of descent of the plunger of the flow tester versus the temperature was plotted, and a temperature at which the half amount of the sample flowed out was taken as the softening point of the sample.

(2) Glass Transition Point

Using a differential scanning calorimeter "Q-100" (manufactured by TA Instruments Japan Inc.), 0.01 to 0.02 g of a sample weighed in an aluminum pan was heated to 200° C., and then, was cooled from that temperature to 0° C. at a temperature drop rate of 10° C./min. Subsequently, the measurement was performed while raising the temperature to 150° C. at a temperature rise rate of 10° C./min. A temperature at which an extension of a baseline in a region of the maximum endothermic peak temperature or lower was intersected with a tangential line having a maximum inclination of the curve in a region of from a rise-up portion of the peak to an apex of the peak was read as the glass transition point of the sample.

[Measurement of Solubility in Toluene]

In a 300 ml beaker or a 1000 ml beaker, 0.5 g of a polyesteramide was put, toluene was added thereto, and the mixture was stirred with a stirrer for 1 hour. After stirring, the solution was allowed to stand for 1 hour, and the presence of a precipitate was checked. Toluene was stepwise added with a small amount of the first addition, and the operation of stirring and allowing to stand was performed after every addition. The solubility was determined from the amount of toluene added at the time when a precipitate was no longer found after the solution was allowed to stand.

Production Examples 1 to 7 (Polyesteramide A1 to A7)

The alcohol components, carboxylic acid component, and polyamide component shown in Table 1 were put in a 10-liter four-neck flask equipped with a thermometer, a stainless-steel stirrer bar, a dewatering conduit, a nitrogen introducing tube, and a thermocouple, and tin(II) di(2-ethylhexanoate) was added thereto under nitrogen atmosphere. The temperature was increased to 235° C. Then, the mixture was subjected to a reaction at 235° C. for 6 hours, followed by a reaction at 235° C. under a reduced pressure of 8.3 kPa for 1 hour, to obtain polyesteramides A1 to A7. The results are shown in Table 1.

For the polyesteramide A5, the melting point was measured.

Production Example 8 (Polyester a1)

The alcohol components and carboxylic acid component shown in Table 1 were put in a 10-liter four-neck flask equipped with a thermometer, a stainless-steel stirrer bar, a dewatering conduit, a nitrogen introducing tube, and a thermocouple, and tin(II) di(2-ethylhexanoate) and gallic acid were added thereto under nitrogen atmosphere. The temperature was increased to 235° C. Then, the mixture was subjected to a reaction at 235° C. for 8 hours, followed by a reaction at 235° C. under a reduced pressure of 8.3 kPa until the softening point shown was achieved, to obtain a polyester a1. The results are shown in Table 1.

TABLE 1

| | | | Production Example | | | | | | | | | |
|---|---|---|---|---|---|---|---|---|---|---|---|---|
| | | | 1 | | 2 | | 3 | | 4 | | 5 | |
| | Kind of resin | | A1 | | A2 | | A3 | | A4 | | A5 | |
| Raw material monomer | Monomer composition | | Charged amount (g) | Molar ratio *1 | Charged amount (g) | Molar ratio *1 | Charged amount (g) | Molar ratio *1 | Charged amount (g) | Molar ratio *1 | Charged amount (g) | Molar ratio *1 |
| | Alcohol component | BPA PO Adduct *2 | 1554 | 21 | 1409 | 15 | 1554 | 21 | 1204 | 10 | — | — |
| | | BPA EO Adduct *3 | 4328 | 64 | 3926 | 45 | 4328 | 64 | 3353 | 30 | — | — |
| | | 1,6-Hexanediol | — | — | — | — | — | — | — | — | 3617 | 85 |
| | Carboxylic acid component | Terephthalic acid | 2764 | 80 | 2451 | 55 | 2764 | 80 | 2112 | 37 | 4771 | 80 |
| | Polyamide component | Nylon 6 *4 | 354 | 15 | 1213 | 40 | — | — | 2332 | 60 | 611 | 15 |
| | | Nylon 6,6 *5 | — | — | — | — | 354 | 15 | — | — | — | — |
| | | Nylon 12 *6 | — | — | — | — | — | — | — | — | — | — |
| | A/N ratio (mol %/mol %) *7 | | 85/15 | | 60/40 | | 85/15 | | 40/60 | | 85/15 | |
| Esterification catalyst | Tin(II) di(2-ethylhexanoate) (charged amount, g) | | 45 | | 45 | | 45 | | 45 | | 45 | |
| Esterification promoter | Gallic acid (charged amount, g) | | 0 | | 0 | | 0 | | 0 | | 4.5 | |
| Properties | Softening point (° C.) | | 105.8 | | 100.4 | | 104.2 | | 94.1 | | 135.9 | |
| | Glass transition point ($T_g$, ° C.) | | 62.7 | | 54.6 | | 61.9 | | 45.7 | | 140.1 (melting point) | |
| | Acid value (mgKOH/g) | | 6.2 | | 7.6 | | 5.7 | | 8.0 | | insoluble | |
| | Hydroxyl value (mgKOH/g) | | 23.2 | | 29.0 | | 24.3 | | 28.9 | | insoluble | |
| | Toluene solubility (g/L) | | >20 | | >10 | | >20 | | 2.5 | | 0.5 | |

| | | | Production Example | | | | | |
|---|---|---|---|---|---|---|---|---|
| | | | 6 | | 7 | | 8 | |
| | Kind of resin | | A6 | | A7 | | a1 | |
| Raw material monomer | Monomer composition | | Charged amount (g) | Molar ratio *1 | Charged amount (g) | Molar ratio *1 | Charged amount (g) | Molar ratio *1 |
| | Alcohol component | BPA PO Adduct *2 | 1510 | 21 | 1605 | 24 | 2205 | 35 |
| | | BPA EO Adduct *3 | 4205 | 64 | 4470 | 73 | 3803 | 65 |
| | | 1,6-Hexanediol | — | — | — | — | — | — |
| | Carboxylic acid component | Terephthalic acid | 2685 | 80 | 2862 | 91 | 2809 | 94 |
| | Polyamide component | Nylon 6 *4 | — | — | 64 | 3 | — | — |
| | | Nylon 6,6 *5 | — | — | — | — | — | — |
| | | Nylon 12 *6 | 600 | 15 | — | — | — | — |
| | A/N ratio (mol %/mol %) *7 | | 85/15 | | 97/7 | | 100/0 | |
| Esterification catalyst | Tin(II) di(2-ethylhexanoate) (charged amount, g) | | 45 | | 45 | | 50 | |
| Esterification promoter | Gallic acid (charged amount, g) | | 0 | | 0 | | 2 | |
| Properties | Softening point (° C.) | | 101.6 | | 108.0 | | 111.5 | |
| | Glass transition point ($T_g$, ° C.) | | 58.8 | | 62.1 | | 64.1 | |
| | Acid value (mgKOH/g) | | 5.5 | | 5.4 | | 3.8 | |
| | Hydroxyl value (mgKOH/g) | | 23.2 | | 25.6 | | 28.7 | |
| | Toluene solubility (g/L) | | >20 | | >20 | | insoluble | |

*1: The molar ratio in the raw material monomer composition is shown, provided that, for nylon 6 and nylon 12, the molar ratios of the caprolactam unit and the lauryllactam unit are respectively shown, and for nylon 6,6, the total number of moles of the adipic acid unit and the hexamethylenediamine unit is shown.
*2: BPA-PO Adduct: polyoxypropylene (2.2 mol) adduct of bisphenol A
*3: BPA-EO Adduct: polyoxyethylene (2.2 mol) adduct of bisphenol A
*4: Nylon 6: Grade A1030BRL manufactured by UNITIKA LTD.
*5: Nylon 66: Grade A125 manufactured by UNITIKA LTD.
*6: Nylon 12: Product Number 181161 manufactured by Sigma-Aldrich
*7: Molar ratio of the amide bond to the alcohol component-derived structural unit (the structural units in polyamide component)

Example 1

Into an asphalt mixer, 15 kg of an aggregate previously heated to 180° C. (see the following description about the composition of the aggregate) was put and mixed at 180° C. for 30 seconds. Subsequently, 0.82 kg of a modified asphalt type II ("HR binder" manufactured by TOA ROAD CORPORATION) was added thereto and was mixed for 30 seconds. Then, 165 g of the polyesteramide A1 obtained in Production Example 1 was further added thereto as a resin and was further mixed for 1 minute, thereby obtaining an asphalt mixture AS-1.

The obtained asphalt mixture AS-1 was stored at 180° C. for 1 hour, and then, a metal mold (300× 300× 50 mm) was filled with about 10.7 kg of the asphalt mixture. With a pneumatic roller compactor (manufactured by Iwata Kogyosho K. K.), a pressure treatment of 25 rotations was applied at a temperature of 150° C. and a load of 0.44 kPa, thereby producing a wheel tracking specimen T-1.

<Composition of Aggregate>
  Crushed stones No. 6 38.5 parts by mass
  Crushed stones No. 7 12.0 parts by mass
  Crushed sand 10.5 parts by mass
  Coarse sand 22.0 parts by mass
  Mountain sand 10.5 parts by mass
  Stone dust 5.0 parts by mass
  Aggregate fine powder 1.5 parts by mass
  Passing % by mass:
Sieve opening 19.0 mm: 100% by mass
Sieve opening 9.50 mm: 80.9% by mass
Sieve opening 4.75 mm: 61.0% by mass
Sieve opening 2.36 mm: 45.0% by mass
Sieve opening 1.18 mm: 30.7% by mass
Sieve opening 600 μm: 20.5% by mass
Sieve opening 300 μm: 13.3% by mass
Sieve opening 150 μm: 9.2% by mass

Examples 2 to 7

Asphalt mixtures AS-2 to AS-7 were prepared and wheel tracking specimens T-2 to T-7 were produced in the same manner as in Example 1 except for employing the blending compositions shown in Table 2.

Comparative Examples 1 to 4

Asphalt mixtures AS-C1 to AS-C4 were prepared and wheel tracking specimens T-C1 to T-C4 were produced in the same manner as in Example 1 except for employing the blending compositions shown in Table 2.

In Comparative Examples 3 and 4, nylon 6 (Grade A1030BRL manufactured by UNITIKA LTD.) was used as a resin a2.

[Evaluation of Water Resistance]

Using a water-immersion wheel tracking tester (AI-1100-S manufactured by Iwata Kogyosho K. K.), a water-immersion wheel tracking test under a high-temperature condition was performed under conditions at a temperature of 60° C., a running speed of 15 reciprocations/minute, and a load of 140 kgf with an iron wheel. The evaluation was performed based on the stripping inflection point (SIP) as a measure. The following document was referred to with respect to the definition of the SIP in the water-immersion wheel tracking test. Near the SIP, water permeation causes stripping of the asphalt composition from the aggregate, and at the SIP or after, deformation and breakage of the specimen are suddenly accelerated attributable to the stripping. Accordingly, as the number of wheel reciprocations until the stripping inflection point is larger, the asphalt pavement body is more superior in the water resistance. A stripping inflection point of 500 or more was regarded acceptable. Document: AASHTO T 324,2019 Edition, 2019-Standard Method of Test for Hamburg Wheel-Track Testing of Compacted Asphalt Mixtures The results are shown in Table 2.

TABLE 2

| | Asphalt mixture | Asphalt *1 | Resin Kind | Resin Added amount *2 | Evaluation of water resistance Inflection point (-) |
|---|---|---|---|---|---|
| Example 1 | AS-1 | A | A1 | 20 | >1200 |
| Example 2 | AS-2 | A | A2 | 20 | >1200 |
| Example 3 | AS-3 | A | A3 | 20 | >1200 |
| Example 4 | AS-4 | A | A4 | 20 | 978 |
| Example 5 | AS-5 | A | A5 | 20 | 821 |
| Example 6 | AS-6 | A | A6 | 20 | 750 |
| Example 7 | AS-7 | A | A7 | 20 | 501 |
| Comparative Example 1 | AS-C1 | A | — | — | 127 |
| Comparative Example 2 | AS-C2 | A | a1 | 20 | 434 |
| Comparative Example 3 | AS-C3 | A | a2 | 20 | 138 |
| Comparative Example 4 | AS-C4 | A | a1 a2 | 10 10 | 410 |

*1: Asphalt A: modified asphalt type II
*2: Amount of resin added relative to 100 parts by mass of asphalt (parts by mass)

As is seen from the results in Table 2, Examples 1 to 7 which are asphalt mixtures containing a prescribed polyesteramide show an enhanced water resistance at a high temperature as compared with Comparative Example 2 which contains only a polyester, Comparative Example 3 which contains only a polyamide, and Comparative Example 4 which separately contains a polyester and a polyamide.

Examples 1 and 3 in which the polyamide component in the polyesteramide is nylon 6 or nylon 6,6 show an enhanced water resistance at a high temperature as compared with Example 6 in which the polyamide component is nylon 12. It is presumably because in nylon 6 and nylon 6,6, the amide groups are densely located, and thus, the number of adsorption points to the aggregate is larger.

The invention claimed is:

1. An asphalt composition, comprising:
    an asphalt and an asphalt modifier,
    wherein the asphalt modifier comprises a polyesteramide that contains an alcohol component-derived structural unit, a carboxylic acid component-derived structural unit, and a polyamide component-derived structural unit.

2. The asphalt composition according to claim 1, wherein the polyesteramide has an [alcohol component/amide bond] ratio, which is a molar ratio of the alcohol component-derived structural unit to the amide bond in the polyamide component-derived structural unit, of 40/60 or more and 95/5 or less.

3. The asphalt composition according to claim 1, wherein the polyesteramide has a solubility in toluene at 20° C. of 10 g/L or more.

4. The asphalt composition according to claim 1, wherein the polyamide component-derived structural unit comprises one or more selected from the group consisting of nylon 6 and nylon 6,6.

5. The asphalt composition according to claim 1, wherein the alcohol component-derived structural unit comprises one or more selected from the group consisting of an aliphatic diol, an aromatic diol, and a trihydric or higher polyhydric alcohol.

6. The asphalt composition according to claim 1, wherein the alcohol component-derived structural unit comprises an alkylene oxide adduct of bisphenol A.

7. The asphalt composition according to claim 1, wherein the carboxylic acid component-derived structural unit comprises one or more selected from the group consisting of an aliphatic dicarboxylic acid, an aromatic dicarboxylic acid, and a tribasic or higher and hexabasic or lower polybasic carboxylic acid.

8. The asphalt composition according to claim 1, wherein the polyesteramide has a [carboxylic acid component/alcohol component] ratio, which is a molar ratio of the carboxylic acid component-derived structural unit to the alcohol component-derived structural unit, of 0.7 or more and 1.5 or less.

9. The asphalt composition according to claim 1, wherein the polyesteramide has an acid value of 2 mgKOH/g or more and 40 mgKOH/g or less.

10. The asphalt composition according to claim 1, wherein the polyesteramide has a hydroxyl value of 1 mgKOH/g or more and 50 mgKOH/g or less.

11. The asphalt composition according to claim 1, wherein the asphalt modifier is contained in an amount of 0.1 parts by mass or more and 50 parts by mass or less relative to 100 parts by mass of the asphalt.

12. An asphalt mixture, comprising:
the asphalt composition according to claim 1 and an aggregate.

13. The asphalt mixture according to claim 12, wherein the aggregate has a content of a powder component with a particle diameter of 150 μm or less of 8% by mass or more and 15% by mass or less.

14. An asphalt modifier, comprising:
a polyesteramide that contains an alcohol component-derived structural unit, a carboxylic acid component-derived structural unit, and a polyamide component-derived structural unit.

15. A method for producing the asphalt modifier according to claim 14, the method comprising:
polycondensating an alcohol component, a carboxylic acid component, and a polyamide component to provide the polyesteramide.

16. A method for producing the asphalt mixture according to claim 12, the method comprising:
polycondensating an alcohol component, a carboxylic acid component, and a polyamide component to provide the polyesteramide; and
mixing a heated aggregate, an asphalt, and the polyesteramide.

17. The method according to claim 16, wherein the heated aggregate has a temperature of 130° C. or higher and 230° C. or lower.

18. The method according to claim 16, wherein the mixing is performed at a temperature of 130° C. or higher and 230° C. or lower.

19. A method for paving a road, the method comprising:
laying the asphalt mixture according to claim 12 on a road to form an asphalt pavement material layer.

20. The method according to claim 19, wherein the laying of the asphalt mixture comprises a process of compacting the asphalt mixture at a temperature of 100° C. or higher and 200° C. or lower.

* * * * *